US012496975B2

(12) United States Patent
Bird et al.

(10) Patent No.: US 12,496,975 B2
(45) Date of Patent: Dec. 16, 2025

(54) RETRACTABLE COMPOSITE BUMPER STEP ASSIST AND STORAGE COMPARTMENT

(71) Applicant: Tiercon Corp, Toronto (CA)

(72) Inventors: Adam Bird, Hamilton (CA); Christopher Campbell, Vineland (CA); Mihai Cioranic, Cambridge (CA)

(73) Assignee: Tiercon Corp, Toronto (CA)

( * ) Notice: Subject to any disclaimer, the term of this patent is extended or adjusted under 35 U.S.C. 154(b) by 357 days.

(21) Appl. No.: 18/031,061

(22) PCT Filed: Oct. 8, 2021

(86) PCT No.: PCT/CA2021/051424
§ 371 (c)(1),
(2) Date: Apr. 10, 2023

(87) PCT Pub. No.: WO2022/073136
PCT Pub. Date: Apr. 14, 2022

(65) Prior Publication Data
US 2023/0373398 A1    Nov. 23, 2023

Related U.S. Application Data

(60) Provisional application No. 63/089,223, filed on Oct. 8, 2020.

(51) Int. Cl.
*B60R 3/02* (2006.01)
*B60R 19/48* (2006.01)

(52) U.S. Cl.
CPC .............. *B60R 3/02* (2013.01); *B60R 19/48* (2013.01)

(58) Field of Classification Search
CPC .................................. B60R 3/02; B60R 19/48
See application file for complete search history.

(56) References Cited

U.S. PATENT DOCUMENTS 3,471,070 A * 10/1969 Olson ..................... B60R 9/065
                                                        280/505
3,614,136 A * 10/1971 Dent ....................... B60R 19/48
                                                        220/255

(Continued)

FOREIGN PATENT DOCUMENTS

KR            102072541         2/2020

*Primary Examiner* — Jacob B Meyer
(74) *Attorney, Agent, or Firm* — Miller, Canfield, Paddock, and Stone

(57) ABSTRACT

A step assist has a step pad operatively coupled to a stationary bumper for a vehicle that is automatically repositionable between a stowed position and a deployed position. An upper surface of the step pad forms a functional step in both the stowed position and the deployed position. The stationary bumper includes a storage compartment having an opening in a top wall of the stationary bumper providing access to the storage compartment. First and second pivot mechanisms are operatively coupled between the stationary bumper and respective distal ends of the step pad. The first and second pivot mechanisms are configured to eccentrically-rotate the step pad between the stowed position wherein a lower surface of the step pad encloses the opening of the storage compartment and the deployed position wherein the step pad is spaced apart from the opening of the storage compartment providing access to the storage compartment.

16 Claims, 7 Drawing Sheets

(56) References Cited

U.S. PATENT DOCUMENTS

| | | | |
|---|---|---|---|
| 4,116,457 A | 9/1978 | Nerem | |
| 4,198,070 A | 4/1980 | Weiler | |
| 4,570,986 A * | 2/1986 | Sams | B60R 11/06 224/489 |
| 4,674,782 A * | 6/1987 | Helber | B60R 9/065 224/489 |
| 4,901,895 A * | 2/1990 | Gancarz | B60R 19/48 293/106 |
| 5,135,274 A * | 8/1992 | Dodd | B60R 19/48 414/466 |
| 5,513,866 A | 5/1996 | Sisson | |
| 5,823,585 A * | 10/1998 | Tanguay | B60R 19/48 293/106 |
| 5,868,412 A * | 2/1999 | Hinkle | B60R 3/00 296/62 |
| 5,979,953 A * | 11/1999 | Rinehart | B60R 19/48 293/106 |
| 6,149,181 A * | 11/2000 | Biederman | B60D 1/60 280/491.1 |
| 6,659,484 B2 | 12/2003 | Knodle et al. | |
| 7,377,563 B1 * | 5/2008 | Demick | B60R 19/48 280/166 |
| 7,775,536 B2 | 8/2010 | Shumway | |
| 8,844,779 B2 | 9/2014 | Cha et al. | |
| 9,346,405 B2 | 5/2016 | Leitner et al. | |
| 9,434,317 B2 * | 9/2016 | Nania | B60R 3/02 |
| 10,071,700 B1 * | 9/2018 | Ghannam | B60R 19/48 |
| 10,179,559 B2 * | 1/2019 | Ghannam | B62D 25/08 |
| 10,195,999 B1 * | 2/2019 | Glickman | B62D 25/085 |
| 10,272,861 B2 * | 4/2019 | Wymore | B60R 9/065 |
| 10,293,737 B2 * | 5/2019 | Granell Peniche | B62B 3/025 |
| 10,449,920 B2 * | 10/2019 | Shen | B60R 19/023 |
| 10,562,456 B2 | 2/2020 | Lynch et al. | |
| 10,933,826 B1 * | 3/2021 | Hood | B60R 19/48 |
| 11,001,208 B2 * | 5/2021 | Hahn | B60R 13/04 |
| 11,325,543 B2 * | 5/2022 | Hahn | B62D 25/2072 |
| 11,987,209 B2 * | 5/2024 | Glickman | B60D 1/01 |
| 12,280,723 B2 * | 4/2025 | Hahn | B60R 13/04 |
| 2004/0108678 A1 | 6/2004 | Berkebile et al. | |
| 2006/0181099 A1 | 8/2006 | Bradsen et al. | |
| 2006/0214386 A1 | 9/2006 | Watson | |
| 2013/0014157 A1 | 1/2013 | Harville | |
| 2013/0087590 A1 * | 4/2013 | Lee | B60R 5/04 224/496 |
| 2013/0087591 A1 * | 4/2013 | Cha | B60R 3/02 224/496 |
| 2013/0088034 A1 * | 4/2013 | Cha | B60R 3/02 296/37.1 |
| 2013/0088035 A1 * | 4/2013 | Cha | B60R 3/02 296/37.1 |
| 2013/0088036 A1 * | 4/2013 | Lee | B60R 5/041 296/37.1 |
| 2013/0147157 A1 | 6/2013 | Lee et al. | |
| 2015/0123373 A1 | 5/2015 | Meszaros | |
| 2017/0298675 A1 | 10/2017 | Dimig et al. | |
| 2018/0029550 A1 | 2/2018 | Campbell et al. | |
| 2023/0373398 A1 * | 11/2023 | Bird | B60R 3/02 |

* cited by examiner

RETRACTABLE COMPOSITE BUMPER STEP ASSIST AND STORAGE COMPARTMENT

CROSS-REFERENCE TO RELATED APPLICATIONS

This application claims priority to U.S. Provisional Application 63/089,223, filed on Oct. 8, 2020, the disclosure of which is incorporated by reference in its entirety.

BACKGROUND OF THE INVENTION

1. Field of the Invention

The present invention relates to a deployable step assist for a vehicle. More particularly, the invention relates to a deployable step assist integrated within a stationary bumper of a vehicle that is automatically repositioned between a stowed position and a deployed position.

2. Description of Related Art

Various automatic deployable step mechanisms are known for repositioning a vehicle step for accessing a vehicle. One known automatically deployable step mechanism is disclosed in U.S. Pat. No. 7,377,563 wherein a vehicle step is integrated within a stationary bumper of a vehicle. The step forms an anterior surface of the stationary bumper when the step is in a stowed position. The step is operatively connected to an electric motor configured to rotate the step between the stowed position and a deployed position. The step is rotated from a vertical orientation in the stowed position to a horizontal orientation in the deployed position. A storage cavity in the stationary bumper has an opening on an anterior surface of the stationary bumper that is accessible when the step is in the deployed position. The opening to the storage compartment is enclosed by the step when the step is rotated to the stowed position.

However, this known automatically deployable step mechanism restricts the utility of the storage compartment in the stationary bumper since the storage compartment has an opening that is on the anterior surface of the stationary bumper. Contents of the storage compartment may fall out of the storage compartment when the step is rotated towards the deployed position. Further, displaced contents of the storage compartment may prevent rotation of the step towards the stowed position. In addition, the step can only be used as a functional step in the deployed position.

It is desirable, therefore, for an automatically deployable step integrated into a stationary bumper to serve as a functional step in both a stowed position and a deployed position. Further, it is desirable that a storage compartment in the stationary bumper have an opening that is in a top wall of the stationary bumper such that contents of the storage compartment are prevented from falling out of the storage compartment when the step is moved towards the deployed position. Finally, it is desirable for the step to enclose the opening of the storage compartment when the step is in the stowed position.

SUMMARY OF THE INVENTION

The present invention relates to a stationary bumper for a vehicle having a step assist that is automatically repositioned between a stowed position and a deployed position. The step assist includes a step pad having an upper surface that forms a functional step in both the stowed position and in the deployed position. The stationary bumper includes a storage compartment having an opening in a top wall of the stationary bumper providing access to the storage compartment. First and second pivot mechanisms are operatively coupled between the stationary bumper and a respective distal ends of the step pad. The first and second pivot mechanisms are configured to eccentrically-rotate the step pad between the stowed position wherein a lower surface of the step pad encloses the opening of the storage compartment and the deployed position wherein the step pad is spaced apart from the opening of the storage compartment providing access to the storage compartment.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

FIGS. 1-13 illustrate a stationary bumper having an integrated step assist assembly and an optional storage compartment according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
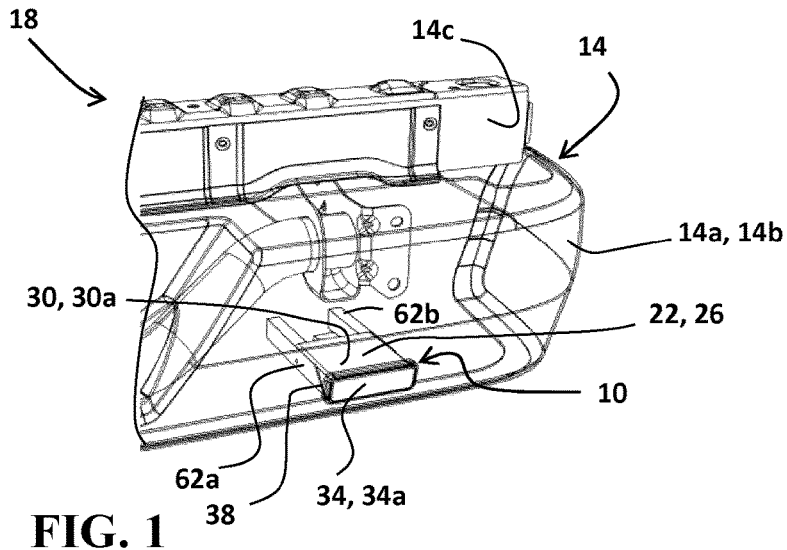
FIG. 1 is a partially transparent perspective view of a portion of a stationary bumper having a step assist assembly integrated within the stationary bumper showing the step assist in a stowed position, according to one embodiment of the present invention.
Figure 2:
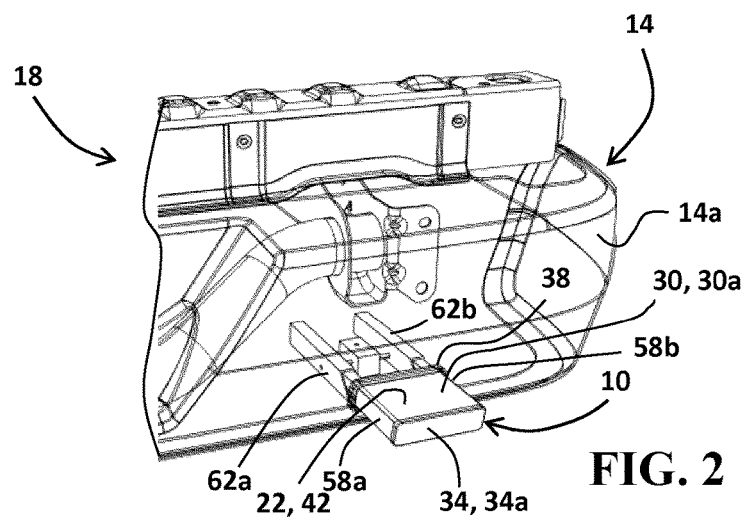
FIG. 2 is a partially transparent perspective view of the portion of the stationary bumper of FIG. 1, illustrating the step assist in a deployed position.
Figure 3:
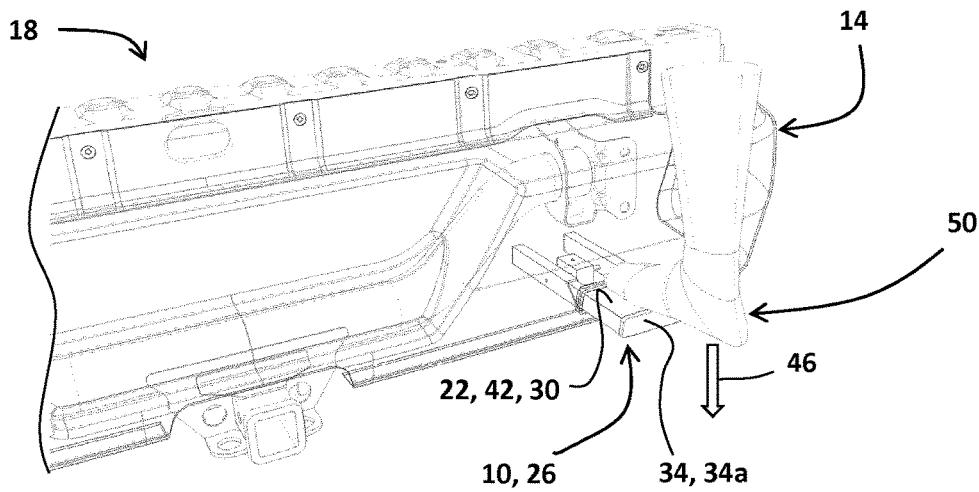
FIG. 3 is a partially transparent perspective view of the portion of the stationary bumper of FIG. 2, illustrating the step assist being used as a functional step.
Figure 4:
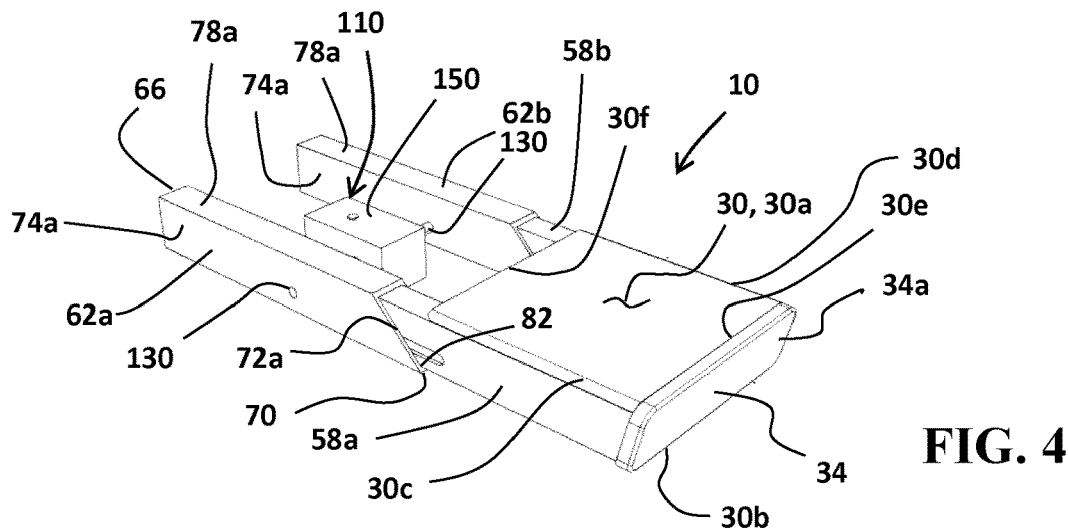
FIG. 4 is a perspective view of the step assist assembly of FIG. 3 removed from the stationary bumper.
Figure 5:
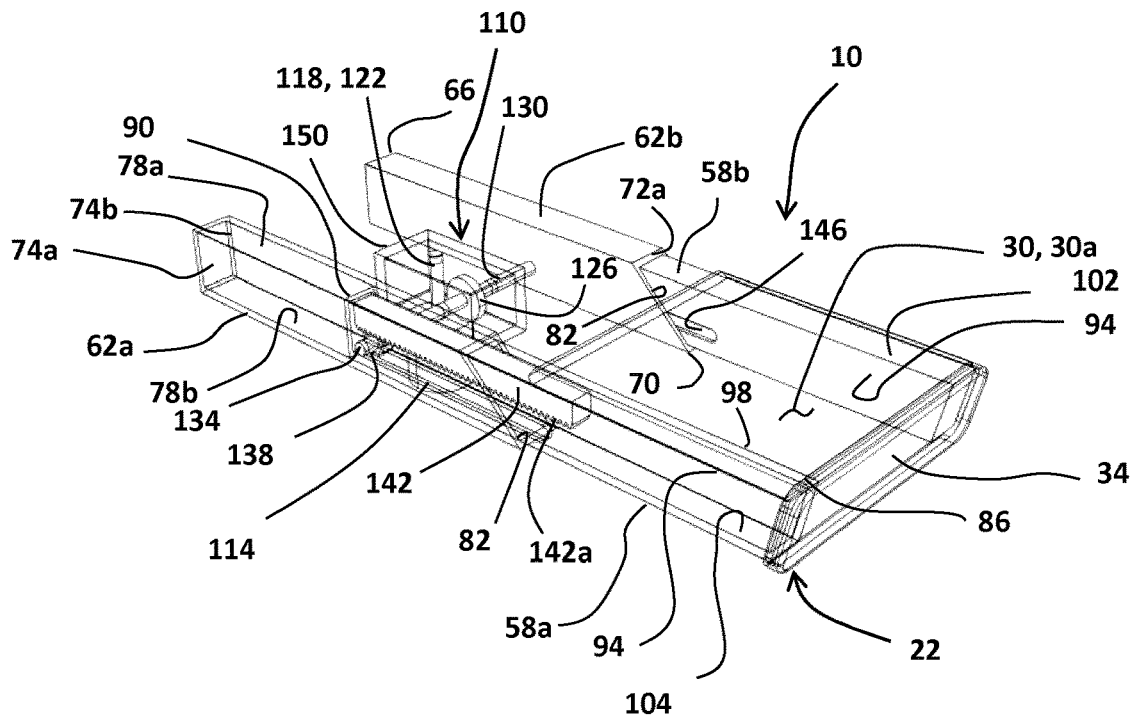
FIG. 5 is a partially transparent perspective view of the step assist assembly of FIG. 4 illustrating a drive mechanism for repositioning the step assist.

FIGS. 1 through 3 illustrate a step assist assembly 10 integrated within a stationary bumper 14 for a vehicle 18 according to one embodiment of the present invention. FIGS. 4 and 5 show the step assist assembly 10 removed from the stationary bumper 14. Referring to FIG. 1, the step assist assembly 10 has a step assist 22 shown in a stowed position 26. The step assist 22 includes a step pad 30 having an upper surface 30a that forms a functional step for accessing the vehicle 18. The upper surface 30a of the step pad 30 extends between left and right distal edges 30c, 30d and front and rear edges 30e, 30f of the step pad 30, as shown in FIG. 4. In addition, the step assist 22 includes a bumper step cover 34 having an anterior surface 34a for enclosing an opening 38 in the stationary bumper 14. The bumper step cover 34 extends between lower and upper surfaces 30b, 30a of the step pad 30. The anterior surface 34a is optionally configured to blend in with an outer surface 14a of the stationary bumper 14 when in the stowed position 26. In certain embodiments, the stationary bumper 14 comprises a traditional steel bumper. In other embodiments, such as shown in FIG. 1, the stationary bumper 14 comprises a composite bumper and optionally includes a composite bumper cover 14b attached to a bumper beam 14c, as non-limiting examples.

The step assist 22 is shown in a deployed position 42 in FIG. 2. FIG. 3 shows the step pad 30 being used as a functional step to support a load 46 as represented by a human foot 50 being positioned on the step pad 30. The step assist 22 is configured to support a predetermined load 46 when the step assist 22 is in the deployed position 42. In the deployed position 42, the step assist 22 provides a step for convenience in accessing the vehicle 18.

Referring to FIGS. 4 and 5, the step pad 30 is supported by opposing left and right arms 58a, 58b. Each of the opposing left and right arms 58a, 58b are sized and shaped to travel within a respective left and right support tube 62a, 62b. Each of the opposing left and right support tubes 62a, 62b have a generally rectangular hollow tubular shape extending between distal and proximal ends 66, 70 and having opposing side walls 74a, 74b extending between opposing upper and lower walls 78a, 78b. Each of the left and right support tubes 62a, 62b includes an opening 82 in a proximal end surface 72a sized and shaped to matingly engage with a respective one of the left and right arms 58a, 58b. In the embodiment shown in FIGS. 4 and 5, the proximal end surface 72a is generally wedge-shaped. However, in other embodiments, the proximal end surface 72a may extend at approximately a right angle from the upper wall 78a of each of the left and right support tubes 62a, 62b. It will be understood that other sizes and shapes of left and right support tubes 62a, 62b can be selected including cylindrical tubes, rods, bars, and the like as non-limiting examples.

Also shown in FIG. 5, the opposing left and right arms 58a, 58b have a generally rectangular hollow tubular shape extending between distal and proximal ends 86, 90. Each of the opposing left and right arms 58a, 58b include opposing inner and outer side walls 94, 98 extending between opposing upper and lower walls 102, 104. It will be understood that in certain embodiments the opposing left and right arms 58a, 58b can have other shapes including but not limited to a hollow cylindrical shape, a solid rod, a U-shaped channel, a solid rectangular-shaped bar, and the like.

Referring to FIG. 5, the step assist assembly 10 is configured to automatically extend the step assist 22 between a deployed position 42 (shown in FIG. 2) and a stowed position 26 (shown in FIG. 1). The motion of the step assist assembly 10 can be activated via pressing on the bumper step cover 34 to activate a switch mechanism. Alternatively, the step assist assembly 10 can be activated by a remote key-press or key-fob, an electrical switch located on the stationary bumper 14 or in the vehicle 18. In addition, other sensor methods such as a proximity sensor can be used to activate the step assist assembly 10 in certain embodiments.

The step assist 22 is repositioned by a motor-driven mechanism 110 within the step assist assembly 10, as illustrated in FIG. 4. One embodiment of the motor-driven mechanism 110 is shown in FIG. 5 and includes an electric motor 114 having an output shaft 118 configured to rotate a worm 122 that is meshingly engaged with a worm gear 126. The worm gear 126 is fixedly coupled to a drive shaft 130 passing axially through the worm gear 126. Each distal end 134 of the drive shaft 130 is fixedly coupled to a pinion 138 that is meshingly engaged with gear teeth 142a of a rack 142. Each rack 142 is attached to a respective one of the opposing left and right arms 58a, 58b. Further, the inner side wall 94 of each of the opposing left and right arms 58a, 58b includes a slot 146 providing clearance for the drive shaft 130 extending through the inner side wall 94. The worm 122 and worm gear 126 are supported within and contained by a housing 150. It will be understood that while the exemplary embodiment shown in FIG. 5 includes a rack 142 and a pinion 138, other embodiments include other combinations of gears, including more or less gears than shown. Further, it will be understood that in certain embodiments the output shaft 118 of the electric motor 114 is directly coupled to the rack 142 without using a worm 122 and a worm gear 126. In addition, it will be understood that while the step pad 30 is shown in FIG. 5 being supported by opposing left and right arms 58a, 58b, certain embodiments optionally include a single arm 58a, 58b supporting the step pad 30. In still other embodiments, the step pad 30 is supported by three or more arms 58a, 58b.

Figure 6:
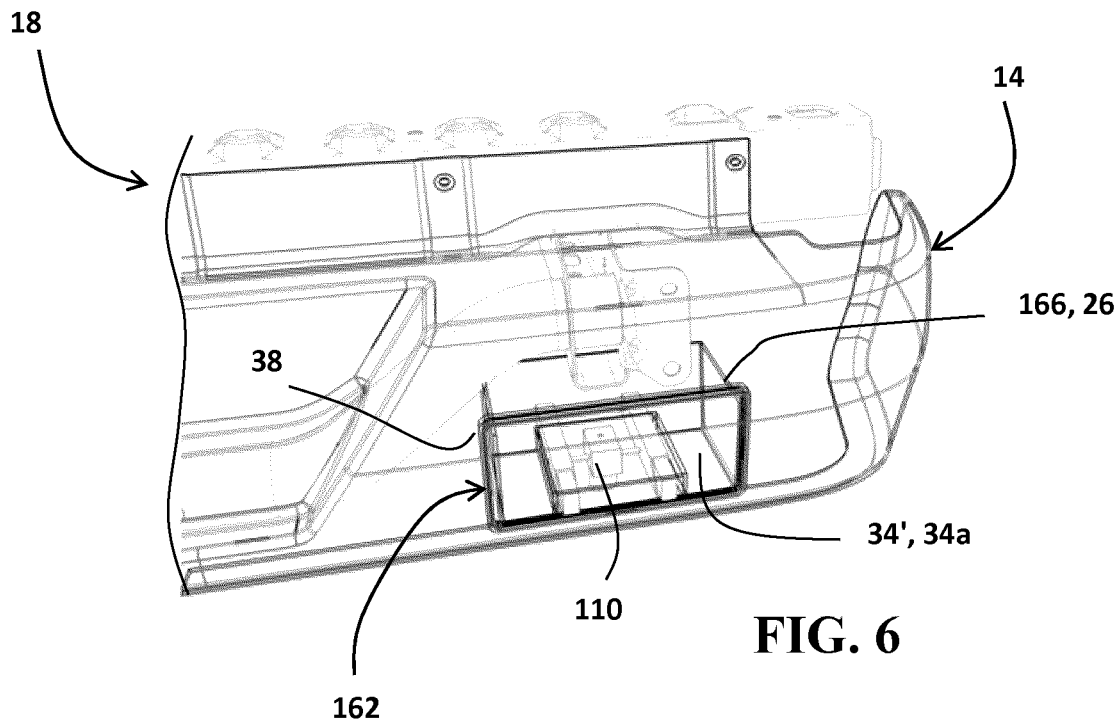
FIG. 6 is a partially transparent perspective view of a portion of a stationary bumper including a storage compartment assembly integrated within the stationary bumper showing a storage compartment in a stowed position, according to a second embodiment of the present invention.
Figure 7:
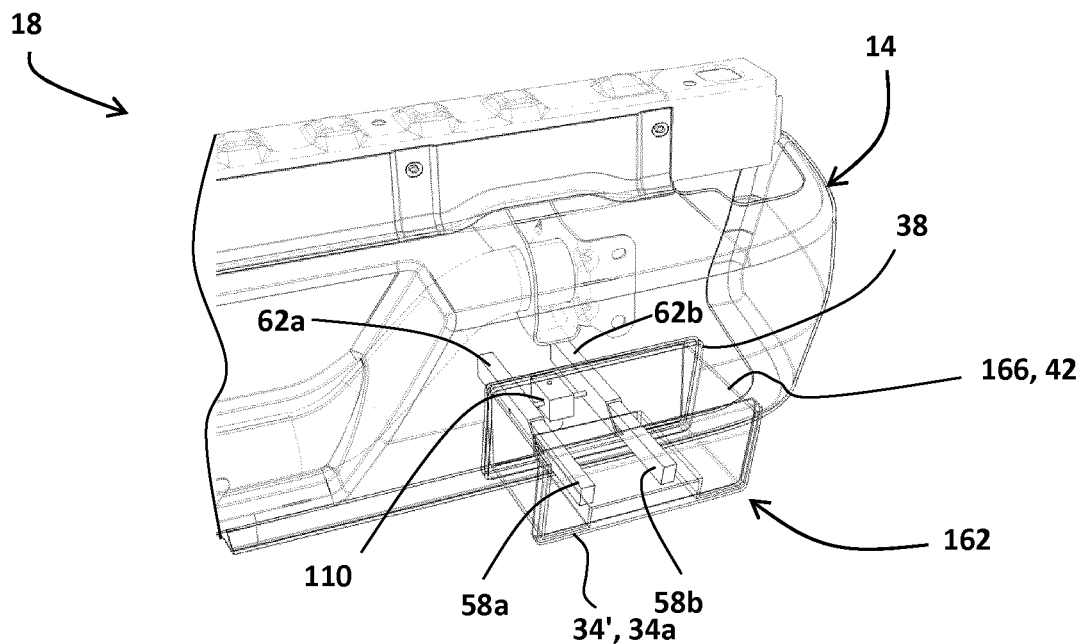
FIG. 7 is a partially transparent perspective view of the portion of the stationary bumper of FIG. 6, illustrating the storage compartment in a deployed position.
Figure 8:
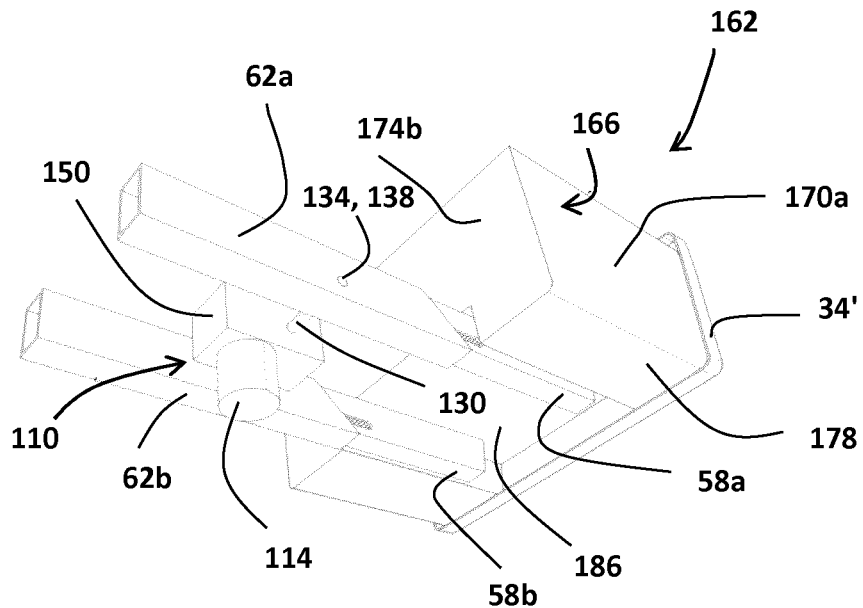
FIG. 8 is a perspective view of the storage compartment assembly of FIG. 7 removed from the stationary bumper.
Figure 9:
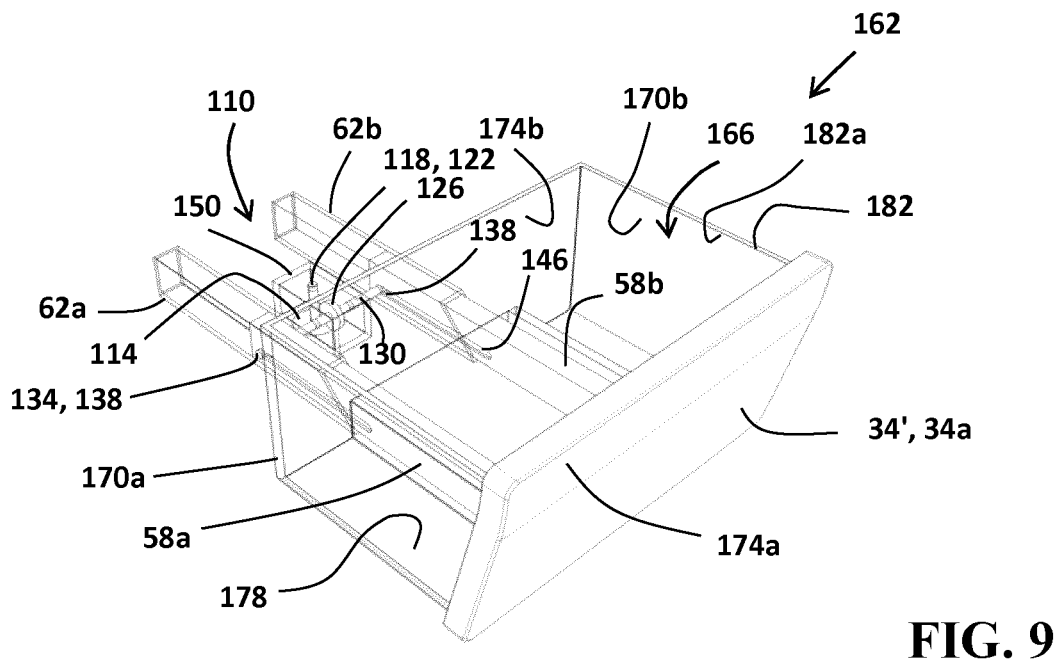
FIG. 9 is a partially transparent perspective view of the storage compartment assembly of FIG. 8, illustrating a drive mechanism for repositioning the storage compartment.

FIGS. 6 and 7 illustrate a storage compartment assembly 162 integrated within a stationary bumper 14 for a vehicle 18 according to another embodiment of the present invention. FIGS. 8 and 9 show the storage compartment assembly 162 removed from the stationary bumper 14. Elements in FIGS. 6-9 that are the same or similar to those used above in FIGS. 1-5 have the same reference number for simplicity. Only the significant differences in relation to FIGS. 1-5 are highlighted below. The difference substantially involves replacing the step pad 30 of FIGS. 1-5 with a storage compartment 166 shown in FIGS. 6-9. The storage compartment 166 provides a functional storage space that is automatically deployed for access to the storage compartment 166. In addition, the storage compartment 166 provides a weather-protected storage space accessible from the exterior of the vehicle 18.

More specifically, referring to FIG. 7, the storage compartment assembly 162 includes the storage compartment 166 supported by opposing left and right arms 58a, 58b that are selectively deployed from respective left and right support tubes 62a, 62b by a motor driven mechanism 110. FIG. 6 shows the storage compartment 166 in a stowed position 26 with FIG. 7 showing the storage compartment 166 in a deployed position 42. The storage compartment 166 includes a bumper compartment cover 34' having an anterior surface 34a configured to enclose an opening 38 in the stationary bumper 14 when the storage compartment 166 is in the stowed position 26.

FIG. 8 shows the storage compartment assembly 162 removed from the stationary bumper 14. In addition, FIG. 9 shows a partially transparent view of the storage compartment assembly 162. The storage compartment 166 includes opposing left and right side walls 170a, 170b and opposing front and rear walls 174a, 174b projecting between a bottom wall 178 and a top wall 182. The top wall 182 of the storage compartment 166 includes an opening 182a for providing access to the storage compartment 166 when the storage compartment 166 is in the deployed position 42. In certain embodiments, the front wall 174a is formed by the bumper compartment cover 34'. However, in other embodiments, the bumper compartment cover 34' is fixedly coupled to the front wall 174a of the storage compartment 166. As illustrated in FIG. 8, the bottom wall 178 optionally includes a recessed portion 186 configured to be fixedly coupled to the left and right arms 58a, 58b. This recesses the left and right arms 58a, 58b within the storage compartment assembly 162 such that the left and right arms 58a, 58b are not visible when the storage compartment 166 is in the deployed position 42.

It will be understood that the storage compartment 166 of FIGS. 6-9 can be combined with the step assist 22 of FIGS. 1-5 by attaching the step pad 30 of FIGS. 1-5 to the top wall 182 of the storage compartment 166. As such, the step pad 30 is optionally rotationally coupled, slidably coupled, and/or removably coupled to the top wall 182 of the storage compartment 166. Thus, combining the step pad 30 with the storage compartment 166 retains the functional step of the first embodiment while providing the functional storage space in the second embodiment.

Figure 10:
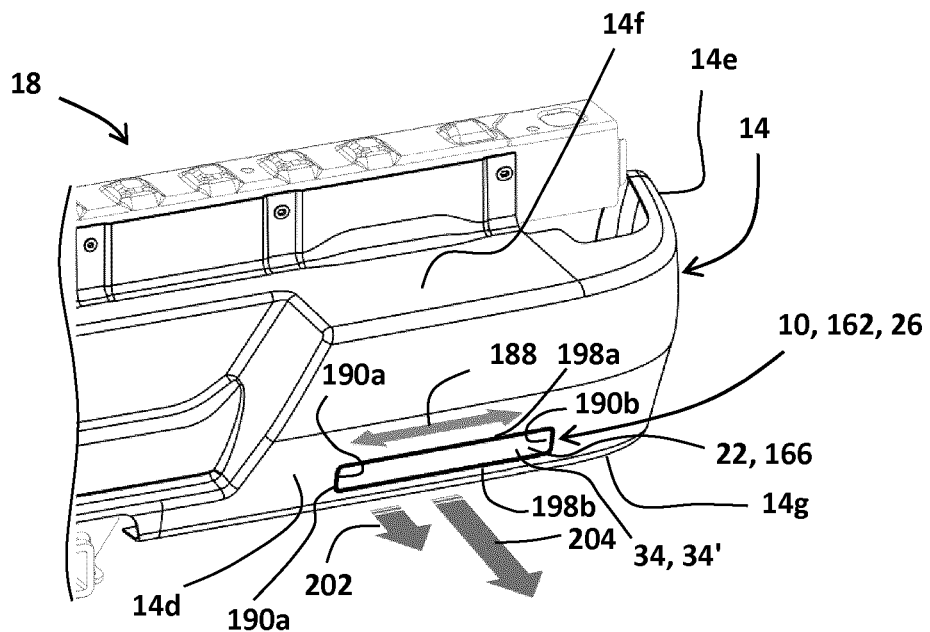
FIG. 10 is a perspective view of a portion of a stationary bumper indicating various embodiments of the step assist assembly of FIG. 4 and the storage compartment assembly of FIG. 8.
Figure 11:
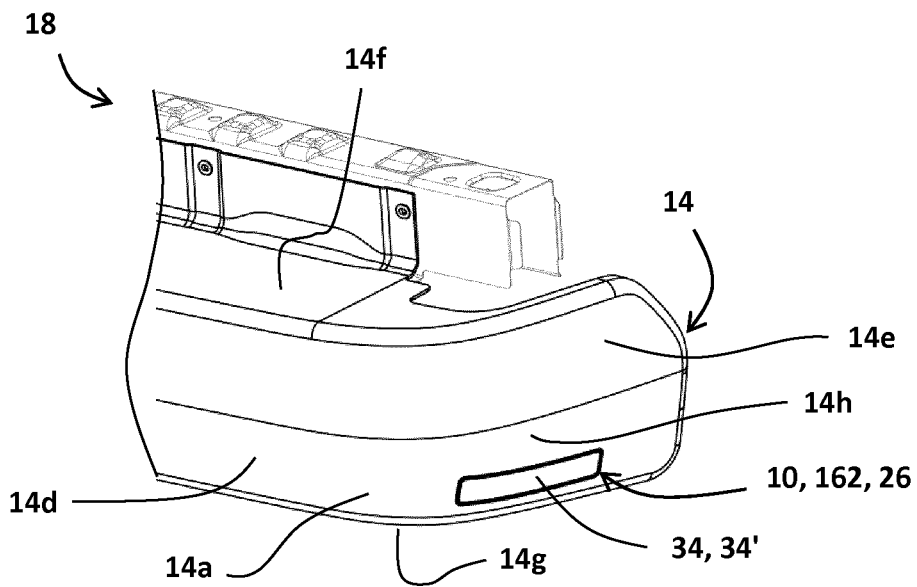
FIG. 11 is a perspective view of a portion of a stationary bumper showing another embodiment of the step assist assembly of FIG. 4 and the storage compartment assembly of FIG. 8 positioned on a curved end portion of the stationary bumper.

FIGS. 10 and 11 illustrate various embodiments of the step assist assembly 10 and the storage compartment assembly 162 within a stationary bumper 14 of a vehicle 18. Referring to FIG. 10, the stationary bumper 14 includes an anterior surface 14d extending generally in a lateral direction between end portions 14e of the stationary bumper 14 and extending between an upper portion 14f and a lower portion 14g of the stationary bumper 14. The step assist assembly 10 and the storage compartment assembly 162 can be selectively positioned anywhere along the anterior surface 14d of the stationary bumper 14. Further, an overall width 188 extending between opposing sides 190a, 190b of the cover 34, 34' can vary as illustrated by arrow 188. In addition, the overall height of the cover 34, 34', as measured between opposing upper and lower edges 198a, 198b of the cover 34, 34', can vary in between embodiments. The step assist assembly 10 and the storage compartment assembly 162 can be selectively configured to extend from the anterior surface 14d of the stationary bumper 14 a variation of distances, as illustrated by arrows 202 and 204 in FIG. 10, when the step assist 22/storage compartment 166 is in the deployed position 42 (shown in FIGS. 2 and 7, respectively). Thus, both the step assist assembly 10 and the storage compartment assembly 162 are scalable in width and depth.

In additional embodiments, the step assist assembly 10 and the storage compartment assembly 162 can be positioned within the end portion 14e of the stationary bumper 14, as shown in FIG. 11. For example, the step assist assembly 10 and the storage compartment assembly 162 can be selectively located within a curved portion 14h of the stationary bumper 14. The cover 34, 34' can be selectively configured to blend in with the outer surface 14a of the stationary bumper 14 when the step assist assembly 10 and the storage compartment assembly 162 are in the stowed position 26. As such, the step assist assembly 10 and the storage compartment assembly 162 remain hidden in the stationary bumper 14 when not in use. This provides a sleek aesthetic since the cover 34, 34' blends in with the stationary bumper 14 when in the stowed position 26.

Figure 12:
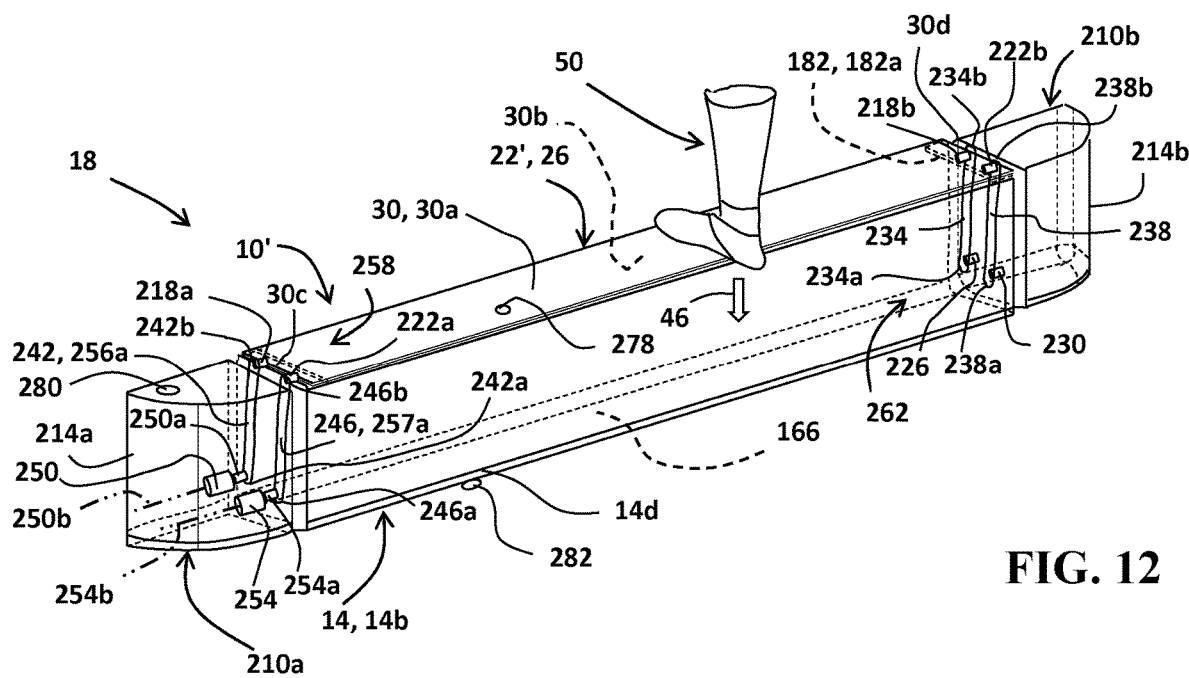
FIG. 12 is a partially transparent perspective view of a portion of a stationary bumper including a step assist assembly having a step assist in a stowed position, according to a third embodiment of the present invention.
Figure 13:
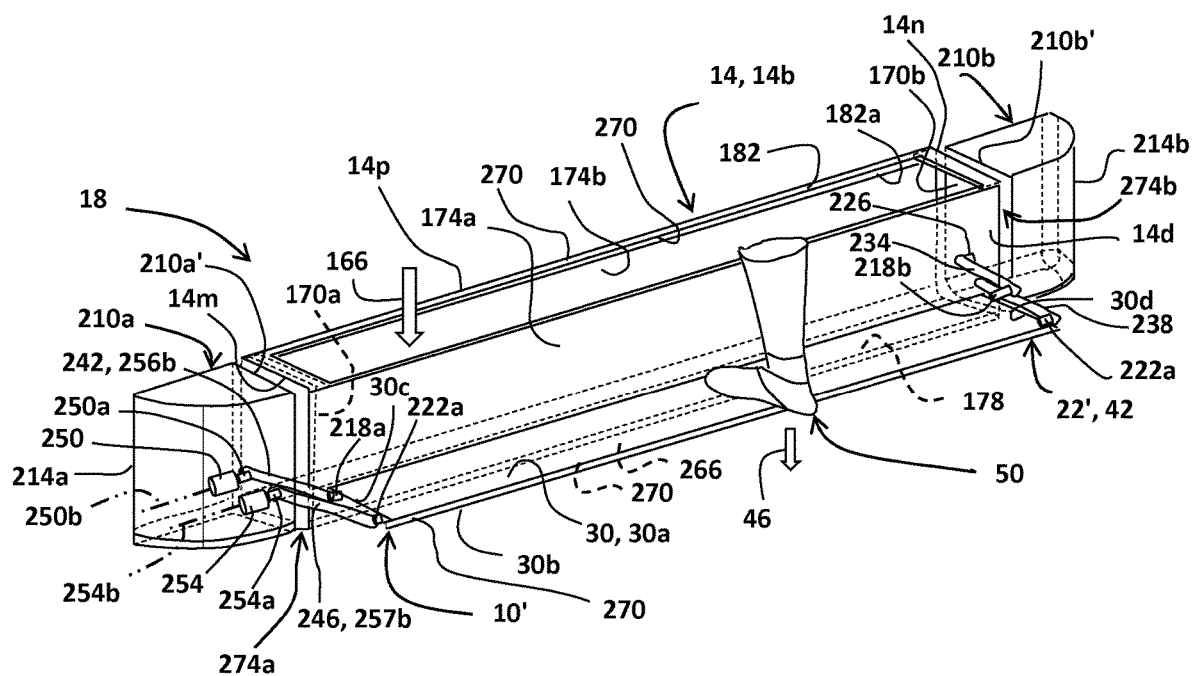
FIG. 13 is a partially transparent perspective view of the portion of the stationary bumper of FIG. 12, illustrating the step assist in a deployed position.

A third embodiment of a step assist assembly 10' having an optional integrated storage compartment 166 is shown in FIGS. 12 and 13. Elements in FIGS. 12 and 13 that are the same or similar to those used above in FIGS. 1-11 have the same reference number for simplicity.

Referring to FIG. 12, the step assist assembly 10' is integrated with a stationary bumper 14 for a vehicle 18. In some embodiments, the stationary bumper 14 is a traditional steel bumper design. In other embodiments, the stationary bumper 14 is a composite bumper. In still additional embodiments, the stationary bumper 14 includes a composite bumper cover 14b assembled with additional components. In the embodiment shown in FIGS. 12 and 13, the stationary bumper 14 includes first and second spaced apart end pieces 210a, 210b with a different one of the first and second spaced apart end pieces 210a, 210b being disposed at each distal end 214a, 214b of the stationary bumper 14. Optionally included within the stationary bumper 14 is a storage compartment 166 having an opening 182a in a top wall 182 for providing access to the storage compartment 166. The storage compartment 166 is spaced between the first and second spaced apart end pieces 210a, 210b. The storage compartment 166 integrated within the stationary bumper 14 provides a storage space accessible from the exterior of the vehicle 18.

As shown in FIG. 12, the step assist assembly 10' includes a step assist 22' abutting the top wall 182 of the stationary bumper 14 in a stowed position 26. The step assist 22' has a step pad 30 forming an upper surface 30a of the step assist 22'. The step assist 22' is configured to support a load 46 such as a human foot 50 being positioned on the step pad 30 when the step assist 22' is in both a stowed position 26 and a deployed position 42. The deployed position 42 of the step assist 22' provides a lowered step for convenience in accessing the vehicle 18. The step pad 30 includes upper and lower surfaces 30a, 30b extending between opposing first and second distal ends 30c, 30d, as best shown in FIG. 13. Spaced apart left inner and outer pad pivots 218a, 222a are fixedly coupled to the first distal end 30c of the step pad 30. Spaced apart right inner and outer pad pivots 218b, 222b are fixedly coupled to the second distal end 30d of the step pad 30.

As best shown in FIG. 12, spaced apart inner and outer lower pivots 226, 230 associated with the second distal end 30d of the step pad 30 are fixedly coupled to the stationary bumper 14. Alternatively, the inner and outer lower pivots 226, 230 are fixedly coupled to the second spaced apart end piece 210b. As illustrated in FIG. 12, a lower end 234a of a first inner link 234 is rotationally coupled to the inner lower pivot 226 with an upper end 234b of the first inner link 234 being rotationally coupled to the right inner pad pivot 218b. Similarly, a lower end 238a of a first outer link 238 is rotationally coupled to the outer lower pivot 230 with an upper end 238b of the first outer link 238 being rotationally coupled to the right outer pad pivot 222b.

Also shown in FIG. 12, a second inner link 242 has an upper end 242b rotationally coupled to the left inner pad pivot 218a. In addition, a second outer link 246 has an upper end 246b rotationally coupled to the outer pad pivot 222a. First and second electric motors 250, 254 are fixedly coupled to the stationary bumper 14. Alternatively, one or more of the first and second electric motors 250, 254 is fixedly coupled to the first spaced apart end piece 210a. The first and second electric motors 250, 254 have first and second output shafts 250a, 254a, respectively. A lower end 242a of the second inner link 242 is fixedly coupled to the first output shaft 250a. Similarly, a lower end 246a of the second outer link 246 is fixedly coupled to the second output shaft 254a. The first and second electric motors 250, 254 selectively rotate the respective second inner and outer links 242, 246 about an axis of rotation 250b, 254b of the respective first and second output shaft 250a, 254a between a respective first rotational position 256a, 257a aligning the step assist 22' in the stowed position 26 and a respective second rotational position 256b, 257b aligning the step assist 22' in the deployed position 42.

Referring to FIG. 12, the second inner and outer links 242, 246 form a first pivot mechanism 258. The first inner and outer links 234, 238 form a second pivot mechanism 262. The first and second pivot mechanisms 258, 262 are configured to extend and retract the step assist 22' from above the stationary bumper 14 to a lower level while simultaneously revealing the storage compartment 166 within the stationary bumper 14. When the step assist 22' is in the stowed position 26, the combined step assist 22' and the stationary bumper 14 appears to be a normal bumper when the step assist 22' is not in use.

As shown in FIG. 12, the first pivot mechanism 258 is automatically rotated by one or more electric motors 250, 254. It will be understood that in alternate embodiments the first pivot mechanism 258 can include additional links and can include one or more gears. As such, certain embodiments include a single electric motor 250, 254 having a single output shaft 250a, 254a that is operatively coupled to both of the second inner and outer links 242, 246 through one or more gears and/or through one or more additional links such that rotation of single output shaft 250a, 254a results in simultaneous rotation of both of the second inner and outer links 242, 246.

The first and second pivot mechanisms 258, 262 are configured to eccentrically-rotate the step pad 30 between a stowed position 26 wherein a lower surface 30b of the step pad 30 is above the top wall 182 of the stationary bumper 14 (shown in FIG. 12) and a deployed position 42 wherein the step pad 30 is positioned in front of the anterior surface 14d of the stationary bumper 14 (shown in FIG. 13). In certain embodiments, the first and second pivot mechanisms 258, 262 are configured to eccentrically-rotate the step pad 30 to a deployed position 42 located below the stationary bumper 14. However, in both the stowed and the deployed positions 26, 42, an upper surface 30a of the step pad 30 remain generally horizontal and forms a functional step for supporting a load 46.

In certain embodiments a storage compartment 166 is integrated within the stationary bumper 14 and has an opening 182a in the top wall of the stationary bumper 14. Positioning the opening 182a to the storage compartment 166 on the top wall 182 (or other upward oriented surface of the stationary bumper 14) prevents contents of the storage compartment 166 from falling out of the storage compartment 166 when the opening 182a to the storage compartment 166 is uncovered. In addition, contents of the storage compartment 166 will not jam the first and second pivot mechanisms 258, 262 since the contents are retained within the storage compartment 166 by the upward-facing opening 182a. Further, a lower surface 266 of the step assist 22' is configured to enclose the opening 182a of the storage compartment 166 when the step pad 30 is in the stowed position 26. As such, the step assist 22' forms a cover configured to enclose the opening 182a to the storage compartment 166.

In still additional embodiments, a seal 270 is attached to one or more of the top wall 182 of the stationary bumper 14, the opening 182a to the storage compartment 166, the lower surface 266 of the step assist 22', and the perimeter of the step assist 22', as illustrated in FIG. 13. Certain embodiments include the opening 182a to the storage compartment 166 being recessed with respect to the top wall 182 of the stationary bumper 14 to accommodate one or more seals 270. In further embodiments, the step assist 22' is configured to fully enclose and shield the opening 182a to the storage compartment 166 in the stowed position 26 such that contents of the storage compartment 166 are protected from weather and external environmental conditions. In all embodiments including a storage compartment 166, the opening 182a to the storage compartment 166 is accessible for adding and removing contents from the storage compartment 166 when the step assist 22' is in the deployed position 42. More specifically, the step assist 22' is spaced apart from the opening 182a of the storage compartment 166 in the deployed position 42, providing access to the storage compartment 166.

Referring to FIG. 13, the stationary bumper 14 includes first and second slots 274a, 274b sized and shaped to allow rotation of the respective first and second inner and outer links 234, 238, 242, 246 between the stowed position 26 and the deployed position 42. In certain embodiments, the first and second slots 274a, 274b are formed between end walls 14m, 14n of a center portion 14p of the stationary bumper 14 and an inner wall 210a', 210b' of an adjacent one of the spaced apart first and second end pieces 210a, 210b. In other embodiments, the first and second slots 274a, 274b are formed entirely within the respective first and second spaced apart end pieces 210a, 210b. In addition, the first and second electric motors 250, 254 are housed entirely within one of the first and second spaced apart end pieces 210a, 210b. In other embodiments, the first and second electric motors 250, 254 are housed within the stationary bumper 14, housed within the vehicle 18, or housed external of the stationary bumper 14, as non-limiting examples.

Referring to FIG. 13, the motion of the step assist assembly 10' can be activated via pressing on the step pad 30 to activate a switch mechanism 278. Alternatively, the step assist assembly 10' can be activated by a remote key-press or key-fob, an electrical switch mechanism 280 located on the stationary bumper 14, and/or an electrical switch located in the vehicle 18, as non-limiting examples. In addition, other sensor methods such as a proximity sensor 282 can be used to activate the step assist assembly 10' in certain embodiments.

One benefit of the step assist for the stationary bumper is that the step assist is automatically repositionable between a stowed position and a deployed position. A second benefit is the step assist has a step pad with an upper surface that forms a functional step in both the stowed position and the deployed position. A third benefit is the stationary bumper includes a storage compartment with an opening in a top wall of the stationary bumper wherein a lower surface of the step pad forms a cover for the opening when the step pad is in the stowed position. A fourth benefit is the contents of the storage compartment are prevented from falling out of the storage compartment when the step pad is moved between the stowed position and the deployed position.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A bumper step assist and storage compartment for a vehicle, comprising:
   a stationary bumper for a vehicle having first and second spaced apart end pieces with a different one of said first and second spaced apart end pieces being disposed at each distal end of said stationary bumper;
   a storage compartment within said stationary bumper spaced between said first and second spaced apart end pieces, said storage compartment having an opening in a top wall of said stationary bumper providing access to said storage compartment;
   a step assist having a step pad defining a cover for enclosing said opening of said storage compartment and for accessing said vehicle, said step pad including opposing first and second distal ends extending between opposing upper and lower surfaces of said step pad; and
   first and second pivot mechanisms, each of said first and second pivot mechanisms operatively coupled to a respective one of said first and second distal ends of said step pad and configured to eccentrically-rotate said step pad between a stowed position wherein said lower surface of said step pad encloses said opening of said storage compartment and a deployed position wherein said step pad is spaced apart from said opening of said storage compartment providing access to said storage compartment;
   wherein said upper surface of said step pad forms a functional step for accessing said vehicle when said step pad is in said stowed position and when said step pad is in said deployed position; and
   said first pivot mechanism is operatively coupled to a first electric motor configured to rotate said first pivot mechanism between a first rotational position wherein said step pad is in said stowed position and a second rotational position wherein said step pad is in said deployed position.

2. The bumper step assist and storage compartment as set forth in claim 1, wherein:
   said first pivot mechanism includes a first inner link and a first outer link, each of said first inner and outer links having respective upper and lower link ends;
   said second pivot mechanism includes a second inner link and a second outer link, each of said second inner and outer links having respective upper and lower link ends;
   said upper link end of each of said first inner and outer links is rotationally coupled to a respective one of first inner and outer pivots attached to said first distal end of said step pad;
   said upper link end of each of said second inner and outer links is rotationally coupled a respective one of second inner and outer pivots attached to said second distal end of said step pad;
   said first inner and outer pivots being spaced apart on said first distal end of said step pad; and
   said second inner and outer pivots being spaced apart on said second distal end of said step pad.

3. The bumper step assist and storage compartment as set forth in claim 2, wherein:
   said lower link end of said first inner link of said first pivot mechanism is operatively coupled to said first electric motor configured to rotate said first inner link between said first rotational position and said second rotational position.

4. The bumper step assist and storage compartment as set forth in claim 3, wherein:
   each of said lower link ends of said second inner and outer links is rotationally coupled to said stationary bumper.

5. The bumper step assist and storage compartment as set forth in claim 4, wherein:
   said lower link end of said first outer link of said first pivot mechanism is operatively coupled to a second electric motor configured to rotate said first outer link between a third rotational position aligning said step pad in said stowed position and a fourth rotational position aligning said step pad is in said deployed position.

6. The bumper step assist and storage compartment as set forth in claim 4, wherein:
   said stationary bumper is a composite bumper.

7. The bumper step assist and storage compartment as set forth in claim 4, wherein:
   said stationary bumper is a steel bumper.

8. The bumper step assist and storage compartment as set forth in claim 4, wherein:
   said stationary bumper comprises a composite bumper cover.

9. The bumper step assist and storage compartment as set forth in claim 8, wherein:
   one or more of said step pad and said opening to said storage compartment includes a seal.

10. A bumper step assist for a vehicle, comprising:
    a stationary bumper for a vehicle having a first and second spaced apart end pieces with a different one of said first and second spaced apart end pieces being disposed at each distal end of said stationary bumper, said stationary bumper including a top wall;
    a step assist having a step pad for accessing said vehicle, said step pad including opposing first and second step end portions extending between opposing upper and lower step surfaces; and
    a first pivot mechanism rotationally coupled between said first step end portion and a first electric motor;
    a second pivot mechanism rotationally coupled between said second step end portion and said stationary bumper; and
    first and second pivot mechanisms configured to eccentrically-rotate said step pad between a stowed position wherein said step pad covers a portion of said top wall of said stationary bumper and a deployed position wherein said step pad is spaced apart from said top wall of said stationary bumper and spaced apart from said stowed position;
    wherein said upper step surface of said step pad forms a functional step when said step pad is in said stowed position and when said step pad is in said deployed position; and wherein said first electric motor rotates said first pivot mechanism between a first rotational position aligning said step pad in said stowed position and a second rotational position aligning said step pad in said deployed position.

11. The bumper step assist as set forth in claim 10, wherein:
said stationary bumper includes a storage compartment spaced between said first and second spaced apart end pieces, said storage compartment having an opening in said top wall of said stationary bumper providing access to said storage compartment;
said step pad forming a cover for enclosing said opening of said storage compartment when said step pad is in said stowed position; and
said step pad being spaced apart from said opening of said storage compartment when said step pad is in said deployed position such that said opening to said storage compartment is accessible.

12. The bumper step assist as set forth in claim 11, wherein:
said first pivot mechanism includes a first inner link and a first outer link, each of said first inner and outer links having respective upper and lower link ends;
said second pivot mechanism includes a second inner link and a second outer link, each of said second inner and outer links having respective upper and lower link ends;
said upper link end of each of said first inner and outer links is rotationally coupled to a respective one of first inner and outer pivots attached to said first step end portion;
said upper link end of each of said second inner and outer links is rotationally coupled a respective one of second inner and outer pivots attached to said second step end portion;
said first inner and outer pivots being spaced apart on said first step end portion; and
said second inner and outer pivots being spaced apart on said second step end portion.

13. The bumper step assist as set forth in claim 12, wherein:
said upper link end of said first inner link of said first pivot mechanism is operatively coupled to said first electric motor configured to rotate said first inner link between said first rotational position and said second rotational position.

14. The bumper step assist as set forth in claim 13, wherein:
each of said upper link ends of said second inner and outer links is rotationally coupled to said stationary bumper.

15. The bumper step assist as set forth in claim 14, wherein:
said upper link end of said first outer link of said first pivot mechanism is operatively coupled to a second electric motor configured to rotate said first outer link between a third rotational position aligning said step pad in said stowed position and a fourth rotational position aligning said step pad in said deployed position.

16. The bumper step assist as set forth in claim 15, wherein:
said step pad being automatically repositioned between said stowed position and said deployed position in response to activation of at least one of an electrical switch mechanism, a proximity sensor, and a remote key-press.

* * * * *